United States Patent [19]

Tajima

[11] Patent Number: 4,518,227
[45] Date of Patent: May 21, 1985

[54] METHOD OF WIDENING THE ANGULAR FIELD OF A PHOTOGRAPHIC OBJECTIVE LENS

[76] Inventor: Akira Tajima, No. 267, Kamihirama Nakahara-ku, Kawasaki-shi, Kanagawa-ken, Japan

[21] Appl. No.: 890,233

[22] Filed: Mar. 27, 1978

Related U.S. Application Data

[63] Continuation of Ser. No. 586,259, Jun. 12, 1975, abandoned.

[30] Foreign Application Priority Data

Jun. 18, 1974 [JP] Japan .................................. 46-69399

[51] Int. Cl.³ .................. G02B 15/10; G02B 15/18
[52] U.S. Cl. ...................... 350/422; 350/428
[58] Field of Search ................ 350/183, 184, 186, 255, 350/214, 220, 225, 230, 215, 216

[56] References Cited

U.S. PATENT DOCUMENTS

| | | | |
|---|---|---|---|
| 1,169,731 | 1/1916 | Mengel | 350/183 |
| 3,736,049 | 5/1973 | Shimizu | 350/214 |
| 3,748,022 | 7/1973 | Tajima | 350/214 |
| 3,784,284 | 1/1974 | Nakamura | 350/214 |
| 3,848,968 | 11/1974 | Grey | 350/184 |
| 3,884,555 | 5/1975 | Suwa | 350/184 |

*Primary Examiner*—John K. Corbin
*Assistant Examiner*—Paul M. Dzierzynski

[57] ABSTRACT

A varifocal objective lens or mono-focal objective lens with a macro-focusing mechanism is provided with a concave lens component detachably mounted at the front thereof to widen the angular field of view of the objective lens while adjusting the marco-focusing mechanism to a position, where the object position for which the objective lens is focused is substantially coincident with the position of the front focal point of the concave lens component.

8 Claims, 11 Drawing Figures

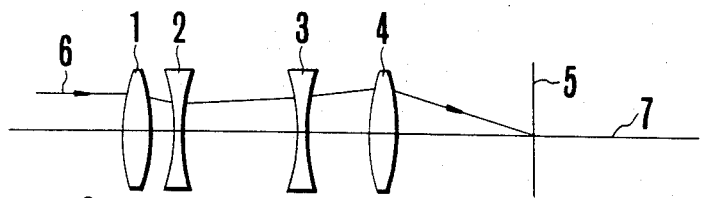
FIG.1(A)
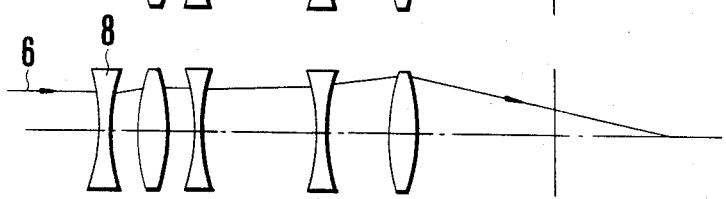
FIG.1(B)
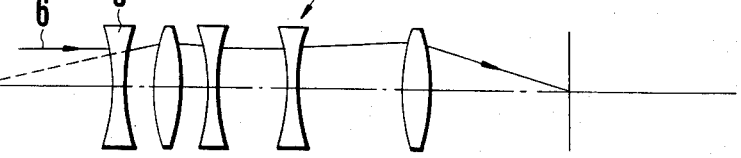
FIG.1(C)
FIG. 2
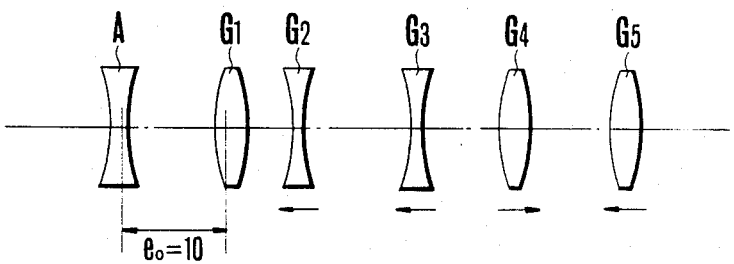

METHOD OF WIDENING THE ANGULAR FIELD OF A PHOTOGRAPHIC OBJECTIVE LENS

This is a continuation of application Ser. No. 586,259 filed on June 12, 1975 now abandoned.

BACKGROUND OF THE INVENTION

1. Field of the Invention

This invention relates to photographic lens system, and more particularly to a method of widening the angular field of view of a varifocal or mono-focal objective lens.

2. Description of Prior Art

To widen the angular field of view of a zoom lens, it is known to employ a wide converter lens as attached to the front of the zoom lens at the wide angle setting thereof. When the wide converter lens is afocal, the combined lens system is adjustable for focusing purposes within the same range as the zoom lens itself has. When it is not afocal, a change is resulted in the focusing range. In the latter connection, the focusing adjustment must be modified. As far as the widening of the angular field of view by use of the wide converter lens is concerned, therefore, it is required that the converter lens be afocal in itself, e.g. of the inverted Galileian type afocal converter lens. This requirement has conventionally been fulfiled by constructing the converter lens from a front concave lens group and a rear convex lens group satisfying the following relationship:

$$|f_1|+D=f_2$$

wherein $f_1$ is the focal length of the concave lens group;

$f_2$ is the focal length of the convex lens group; and

D is the interval between the principal points of the convex and concave lens groups.

The wide converter lens of such a construction has, however, the following problems. (i) The provision of the two lens groups of different sign power causes embodiment of a relatively complex lens structure which in turn makes the converter lens quite heavy and bulky. (ii) For facilitating a further increase in the field angle with decreasing angular magnification, it is necessary either to increase the principal point interval D, or to decrease the focal lengths $f_1$ and $f_2$ of the concave and convex lens groups with sacrificing the increase of the weight and bulk of the complete converter lens. Such problems become more serious as the field angle is increased. Accordingly, it has been difficult to increase the field angle of the zoom lens by use of the wide converter attachment lens based on the above mentioned relationship.

SUMMARY OF THE INVENTION

An object of the present invention is to provide a method of and apparatus for increasing the field angle of a varifocal or mono-focal objective lens by use of an attachment lens of simple lens structure and small size without producing the above mentioned problems which are encounted in the prior art afocal wide converter lens design.

Another object of the invention is to provide a single or composite attachment lens of the nature described which is adapted for use at the front of a varifocal or mono-focal objective lens of which the mount has a focusing mechanism adjustable for macro photography at the wide angle setting of the objective lens.

Most of the normal photographic objective lenses distinguished from macro objective lenses are designed to have focusing lens members adjustable to suit object distances longer than about one meter. In application of the invention to such normal objective lenses, the attachment lens of the nature described must have an absolute focal length larger than the minimum object distance, e.g. one meter for which the objective lens can be focused, or otherwise it is impossible by movement of the focusing member of the objective lens to effect focusing to suit object distances between the above mentioned minimum object distance, e.g. one meter, and the absolute focal length of the attachment lens.

From one aspect thereof, the present invention is particularly adapted to increase the field angle of a zoom lens having a macro-focusing provision in addition to the normal focusing lens member by use of an attachment lens having a negative focal length shorter in absolute value than the lower limit of the range of object distances for which the zoom lens can be focused by means of the normal focusing lens member alone. With the combined lens system consisting of the attachment lens and the zoom lens, the focusing is effected by utilizing the macro-focusing provision in such a manner that a part of the zoom lens other than the focusing lens member, for example, variator, compensator, relay lens, or a part of the relay lens is forwardly or rearwardly moved from the respective position corresponding to the wide angle setting, while maintaining a substantial coincidence between the plane of a virtual image of the object formed by the attachment lens itself and the object position for which the zoom lens itself is focused. It is important to perform such a focusing operation at the wide angle setting of the zoom lens. This focusing mode is known in the art as the so-called "wide macro-focusing".

From another aspect thereof, the present invention is based on a finding that the absolute value of the focal length of the attachment lens is preferably smaller than 25 times the minimum focal length of a variable focal length objective lens, or the focal length of a mono-focal objective lens.

BRIEF DESCRIPTION OF THE DRAWINGS

FIG. 1A is a schematic representation of a typical zoom lens with the path of a light ray coming from an object at infinity.

FIG. 1B is a schematic representation of a combined lens system consisting of an attachment lens and the zoom lens of FIG. 1A.

FIG. 1C is a schematic representation of the combined lens system of FIG. 1B, wherein the zoom lens is focused by movement of a compensator for an object position coincident with the front focal point of the attachment lens.

FIG. 2 is a schematic representation showing the combined lens predesign according to the invention.

DETAILED DESCRIPTION OF THE PREFERRED EMBODIMENT

Figure 3:
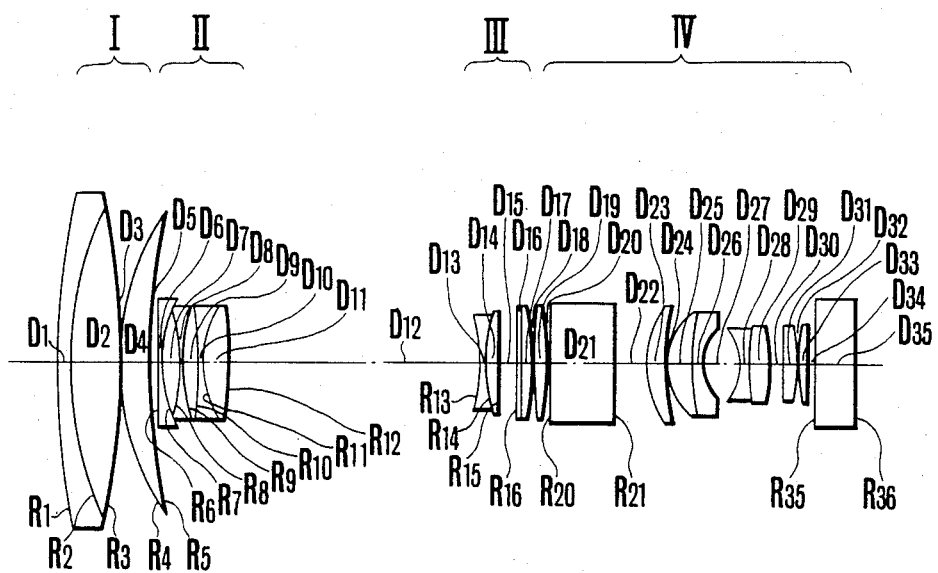
FIG. 3 is a block diagram of an example of a zoom lens for which the invention is to be applied.
Figure 4:
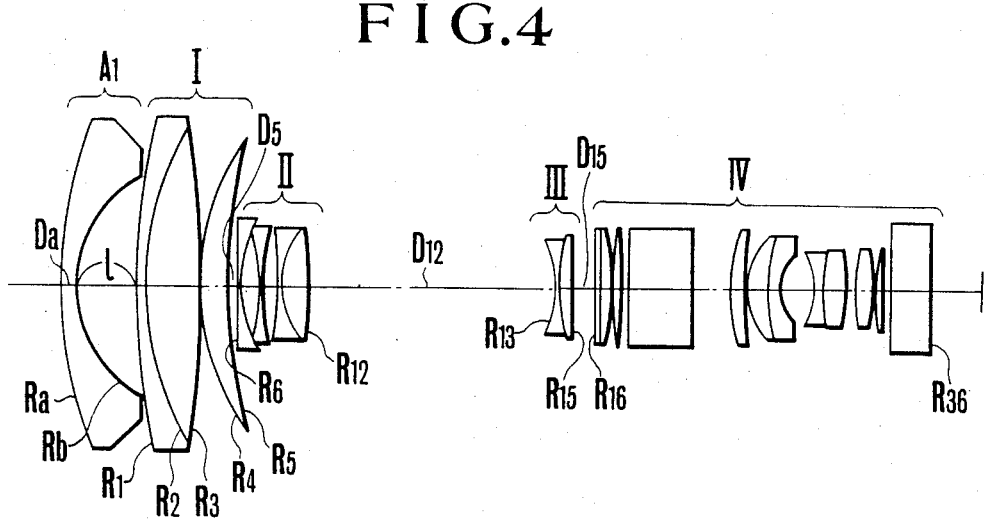
FIGS. 4 through 9 are block diagrams of six examples of an attachment lens according to one embodiment of the invention, each being shown as combined with the zoom lens of FIG. 3.
Figure 5:
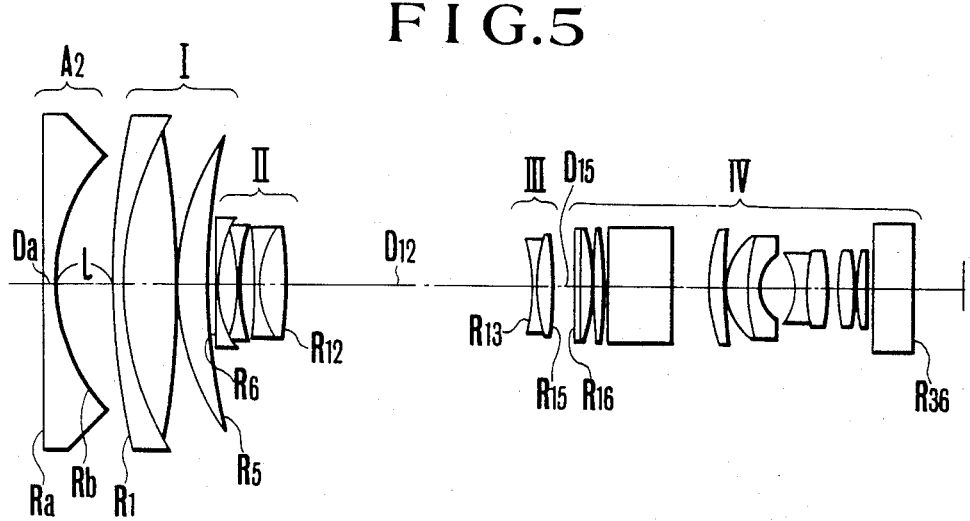
Figure 6:
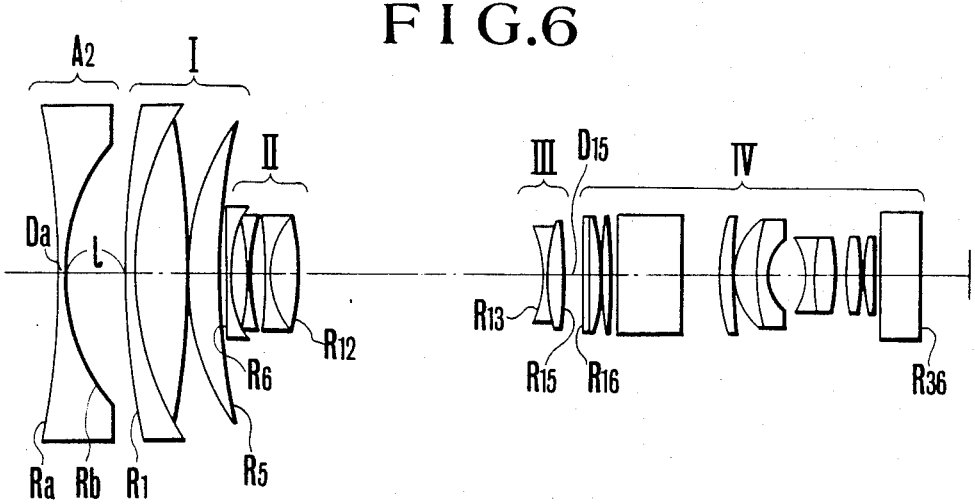
Figure 7:
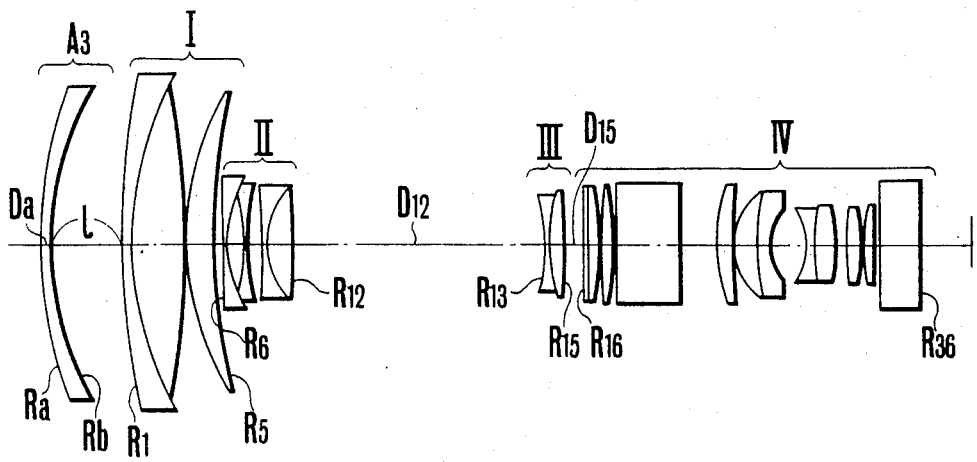
Figure 8:
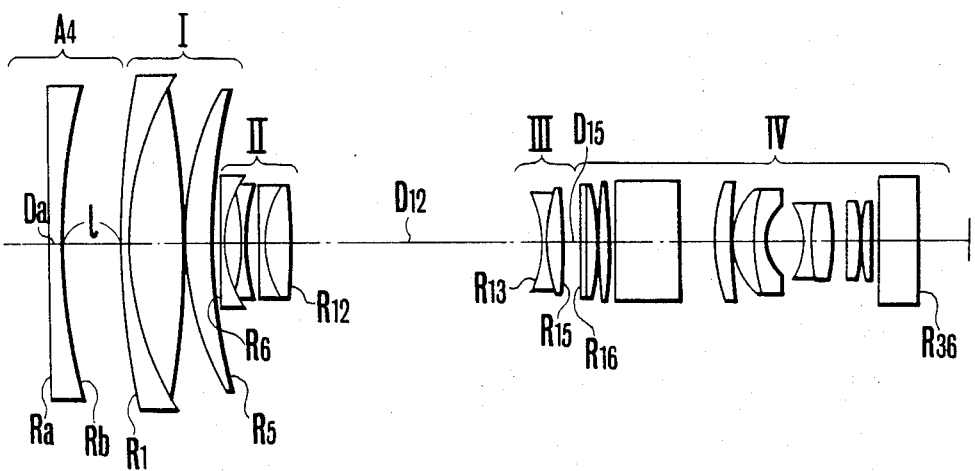
Figure 9:
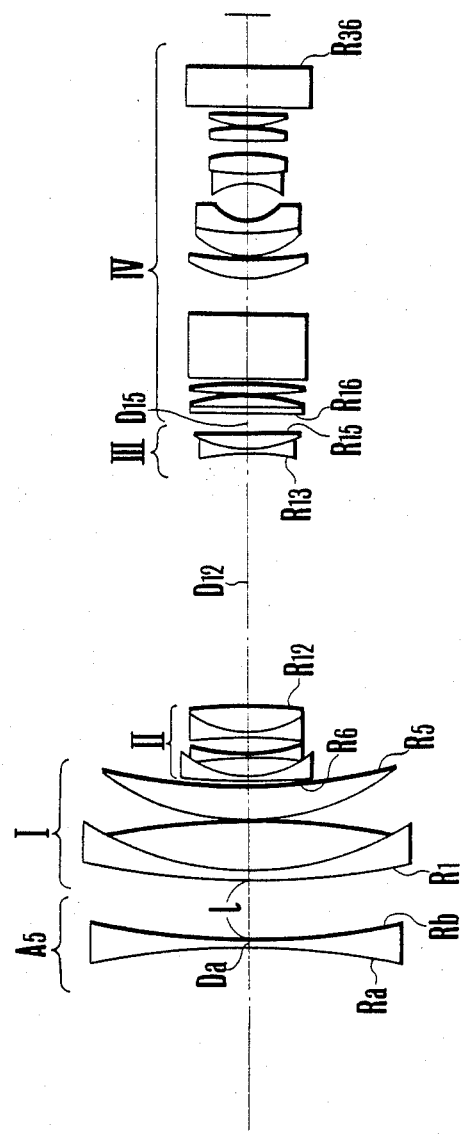

Referring to FIGS. 1A, 1B and 1C, and first to FIG. 1A, there is shown a zoom lens comprising a focusing lens member 1, variator 2, compensator 3 and relay lens 4 optically aligned on a common axis 7, so that a ray of light 6 incident upon the zoom lens in parallel therewith is focused at the focal plane 5. In order to increase the field angle of the zoom lens of FIG. 1A, there is provided an attachment lens 8 of negative power positioned adjacent and in front of the focusing lens member 1 of the zoom lens in axial alignment therewith, whereby the axial ray 6 is focused at a point rearwardly deviated from the focal plane 5 of said zoom lens itself, as shown in FIG. 1B. With this lens arrangement, the focusing of axial ray 6 coming from infinite object at the focal plane 5 is effected by movement of compensator 3 beyond the range of zooming movement as shown in FIG. 1C. Such a focusing operation results in coincidence between the front focal point 9 of attachment lens 8 and the object position for which the zoom lens of FIG. 1A itself is focused. It is to be understood that instead of selecting compensator 3 for the focusing purpose, any one of the other lens members 2 and 4 may be selected for focusing movement.

A variety of wide macro-focusing adjustment of the various lens members of a zoom lens having a variable focal length range of from 7 mm to 35 mm provided with an attachment lens of the invention will next described by reference to FIG. 2. The zoom lens of FIG. 2 is shown as comprising five lens members (G1 through G5), the focal lengths of the various lens members and their spatial relationships to each other being tabulated in Table 1 below.

TABLE 1

| Lens | Focal length | Principal point interval |
|---|---|---|
| G1 | $f_1 = 56.54$ | |
| G2 | $f_2 = -15.00$ | $e_{12} = 8.00-34.83$ |
| G3 | $f_3 = -47.36$ | $e_{23} = 36.83-10.00$ |
| G4 | $f_4 = 31.18$ | $e_{34} = 5.00-5.00$ |
| G5 | $f_5 = 19.30$ | $e_{45} = 30.00-30.00$ | wherein
- G1: Focusing lens member
- G2: Variator lens member
- G3: Compensator lens member
- G4: Erector lens member
- G5: Relay lens member
- fi: The focal lengths of each lens member
- eij: The principal point intervals between the successive lens members Gi and Gj.

The variable focal length range of the complete zoom lens: $F = 7 - 35$

Various examples of an attachment concave lens A having a focal length fA, usable with the zoom lens having a power distribution indicated in Table 1 are shown in Table 2 in connection with what lens member is selected for the wide macro-focusing movement, how much the amount of displacement of the selected lens member is necessary for the wide macro-focusing purpose, and how long focal length fz the complete zoom lens itself takes for an infinitely distant object. The focusing lens member G1 remains stationary during the wide macro focusing operation, whereby the principal point interval $e_0$ between the attachment lens A and the lens member G1 is maintained constant at 10 millimeters. The directions of movement of the selected lens members (G2 through G5) are indicated by respective arrows in FIG. 2.

TABLE 2

| Wide macro focusing member | Amount of movement | Focal length fA of attachment lens | Focal length fz occurring in the complete zoom lens |
|---|---|---|---|
| G2 | 3.0 | −163.95 | 5.40 |
| G2 | 5.0 | −80.68 | 4.20 |
| G3 | 1.5 | −67.34 | 4.35 |
| G3 | 2.0 | −40.77 | 3.49 |
| G4 | 1.0 | −85.02 | 4.66 |
| G4 | 1.5 | −42.46 | 3.49 |
| G5 | 0.5 | −60.69 | 4.218 |

A specific example of a zoom lens capable of macro photography shown in FIG. 3, for which the present invention is to be applied may be constructed in accordance with the numerical data given in Table 3, wherein the various lens elements are numbered in order from the front to the rear of the lens system, and wherein R: the radii of curvature of each element surface;

D: the axial thicknesses or air separations between the successive refracting surfaces;

N: the refractive indices for the spectral D line of sodium of the material of each lens element;

V: the Abbe numbers of the material of each lens element

TABLE 3

| | R | D | N | V |
|---|---|---|---|---|
| 1 | 131.918 | 1.72 | 1.80518 | 25.4 |
| 2 | 55.365 | 8.50 | 1.64000 | 60.2 |
| 3 | −198.061 | 0.10 | | |
| 4 | 43.354 | 5.00 | 1.64000 | 60.2 |
| 5 | 94.875 | $D_5$ | | |
| 6 | 104.043 | 0.70 | 1.71300 | 54.0 |
| 7 | 19.844 | 3.20 | | |
| 8 | −38.74 | 0.70 | 1.77250 | 49.6 |
| 9 | 36.985 | 2.30 | | |
| 10 | −101.786 | 0.70 | 1.72342 | 38.0 |
| 11 | 16.543 | 4.50 | 1.78470 | 26.2 |
| 12 | −72.304 | $D_{12}$ | | |
| 13 | −27.427 | 0.60 | 1.78590 | 44.2 |
| 14 | 24.284 | 2.50 | 1.75520 | 27.5 |
| 15 | −199.487 | $D_{15}$ | | |
| 16 | −319.952 | 0.60 | 1.69895 | 30.1 |
| 17 | 276.454 | 2.50 | 1.69680 | 55.7 |
| 18 | −33.288 | 0.10 | | |
| 19 | 224.854 | 1.50 | 1.64000 | 60.2 |
| 20 | −59.96 | 0.70 | | |
| 21 | ∞ | 11.00 | 1.63854 | 55.4 |
| 22 | ∞ | 5.50 | | |
| 23 | 21.7 | 3.15 | 1.75700 | 47.9 |
| 24 | 65.65 | 0.10 | | |
| 25 | 11.50 | 3.88 | 1.71300 | 54.0 |
| 26 | 36.00 | 1.59 | 1.80518 | 25.4 |
| 27 | 8.13 | 6.29 | | |
| 28 | −13.80 | 1.72 | 1.78470 | 26.2 |
| 29 | 49.46 | 3.90 | 1.67790 | 53.3 |
| 30 | −18.866 | 1.76 | | |
| 31 | 137.39 | 2.36 | 1.66446 | 35.8 |
| 32 | −31.92 | 0.10 | | |
| 33 | 21.42 | 1.80 | 1.59270 | 35.6 |
| 34 | 1051.429 | 1.20 | | |
| 35 | ∞ | 6.80 | 1.63854 | 55.4 |
| 36 | ∞ | | | |

In FIG. 3, the first lens group I is the focusing lens group having a focal length $F_I$, the second lens group II is the variator having a focal length $F_{II}$, the third lens group III is the compensator having a focal length $F_{III}$, and the fourth lens group IV is the relay lens having front and rear focal lengths $F_{IVf}$ and $F_{IVr}$.

| Focal length: | |
|---|---|
| $F_I = 68.7$ | $F_{IVf} = 31.1$ |
| $F_{II} = -16.2$ | $F_{IVr} = 26.6$ |
| $F_{III} = -38.5$ | |

Object distance: Infinity
F-number: 1.4
Focal length range of the zoom lens: 7.286–56.7
Variable separation:
$D_5$: 1.038–39.728
$D_{12}$: 41.989–3.681
$D_{15}$: 2.970–2.589

Referring now to FIGS. 4 through 9, there is shown six examples of an attachment lens according to the embodiment of the invention as combined with the zoom lens of FIG. 3. The characteristics of the various attachment lenses shown in FIGS. 4 through 9, and the axial air separation of each attachment lens from the front vertex of the zoom lens are given in Examples 11, 12, 13, 21, 22 and 23 respectively. As far as Examples 11, 12 and 13 are concerned, the third lens group III is moved for wide macro focusing purpose, so that $D_{12}=41.044$, $D_{15}=3.916$, and the object position for the zoom lens is in a distance of 58.534 from the front vertex thereof. As far as Examples 21, 22 and 23 are concerned, the third lens group III is moved for the wide macro focusing purpose, so that $D_{12}=41.535$, $D_{15}=3.424$, and the object position for the zoom lens is in a distance of 158.53 from the front vertex thereof. In the Examples, Ra designates the radius of curvature of the front refracting surface of the attachment lens; Rb designates the radius of curvature of the rear refracting surface of the attachment lens; Da designates the axial thickness of the attachment lens; S designates the axial separation between the attachment lens and the zoom lens; and Ft is the focal length of the combined lens system.

| Focal length | Example 11 | Example 12 | Example 13 |
|---|---|---|---|
| fA | −48.534 | −48.534 | −48.534 |
| Ra | 75.0 | infinity | −200.0 |
| Rb | 20.843 | 29.271 | 34.419 |
| Da | 2.0 | 2.0 | 2.0 |
| S | 10.487 | 10.0 | 9.817 |
| N | 1.60311 | 1.60311 | 1.60311 |
| V | 60.7 | 60.7 | 60.7 |
| Ft | 3.789 | 3.789 | 3.789 |

| | Example 21 | Example 22 | Example 23 |
|---|---|---|---|
| fA | −148.534 | −148.534 | −148.534 |
| Ra | 75.0 | infinity | −200 |
| Rb | 40.413 | 89.580 | 162.86 |
| Da | 2.0 | 2.0 | 2.0 |
| XS | 11.490 | 10.0 | 9.441 |
| N | 1.60311 | 1.60311 | 1.60311 |
| V | 60.7 | 60.7 | 60.7 |
| Ft | 5.597 | 5.597 | 5.597 |

In each of the above mentioned Examples, the combined lens system is focused for an infinitely distant object.

The present invention has been described in connection with the zoom lens. But it is to be understood that the present invention is applicable to mono-focal lenses having macro focusing provision.

What is claimed is:

1. A method of increasing the field angle of a photographic objective having first focusing means which operates when an image of an object from a predetermined close distance to infinity, is focused on a focal plane, the method comprising the steps of:
   (a) providing the photographic objective with macro focusing means which can focus on an object at a shorter distance from the photographic object than the predetermined close distance by moving only part of the lenses forming the photographic objective,
   (b) focusing an image of a predetermined object on the focal point plane by operating the ordinary focusing means,
   (c) providing an attachment lens of negative power in front of the photographic objective, and
   (d) focusing the image formed by the attachment lens on the focal plane by operating the macro-focusing means.

2. The method according to claim 1 in which the focal distance of the attachment lens is shorter than the predetermined close distance of the first focusing means.

3. The method according to claim 2, wherein said photographic objective lens is a zoom lens, and the absolute value of the focal length of said attachment lens is smaller than 25 times the minimum focal length of said zoom lens.

4. The method according to claim 2, wherein said photographic objective lens is a mono-focal lens, and the absolute value of the focal length of said attachment lens is smaller than 25 times the focal length of said mono-focal lens.

5. A wide field angle lens arrangement comprising:
   a lens system formed by a plurality of lenses;
   (a) a first focusing lens group formed of a part of lenses of the lens system for focusing an object on a focal plane from a predetermined close distance to infinity,
   (b) a macro focusing lens group formed by a part of lenses of the lens system, said macro focusing lens group alone being operable to focus an object on the focal plane at a shorter distance to the lens system than the predetermined close distance, and
   (c) an attachment lens in front of the lens system and having a negative refractive power,
   said attachment lens for forming a virtual image of the predetermined object at a position nearer the lens system than the predetermined close distance,
   said virtual image formed being focused on the focal plane by operation of the macro focusing lens group.

6. The arrangement according to claim 5, in which the lens system is a zoom lens including the first focusing lens group, movable lens means movable for zooming and a relay lens group arranged in that order from the object, and a part of the movable lens means is the lens group movable for the macro focusing.

7. The lens system according to claim 6, in which the movable lens means comprises a variator lens group and a compensator lens group arranged in that order from the object, said first variator lens group being arranged to move toward the object when the attachment lens is provided.

8. The lens system according to claim 6, in which the movable lens means comprises a first variator lens group and a compensator lens group arranged in that order from the object, said compensator lens group being arranged to move toward the object when the attachment lens is provided.

* * * * *

UNITED STATES PATENT AND TRADEMARK OFFICE
CERTIFICATE OF CORRECTION

PATENT NO. : 4,518,227
DATED : May 21, 1985
INVENTOR(S) : Akira Tajima

It is certified that error appears in the above-identified patent and that said Letters Patent is hereby corrected as shown below:

On the title page assignee should read:

--(73) Assignee: Canon Kabushiki Kaisha, Tokyo, Japan --.

Signed and Sealed this
Eleventh Day of November, 1986

*Attest:*

DONALD J. QUIGG

*Attesting Officer*  *Commissioner of Patents and Trademarks*